United States Patent [19]

Whitmer

[11] Patent Number: 4,871,051
[45] Date of Patent: Oct. 3, 1989

[54] CLUTCH BOOSTER CONTROL VALVE SYSTEM

[75] Inventor: Randal Whitmer, Mukilteo, Wash.

[73] Assignee: Paccar Inc., Bellevue, Wash.

[21] Appl. No.: 221,926

[22] Filed: Jul. 20, 1988

[51] Int. Cl.⁴ ............................................. F16D 25/06
[52] U.S. Cl. ................................. 192/85 C; 192/856; 192/99 R; 188/359; 188/360
[58] Field of Search ................ 192/85 V, 85 C, 99 S, 192/99 R, 101; 74/388 R, 468, 512; 188/359, 360

[56] References Cited

U.S. PATENT DOCUMENTS

| | | | |
|---|---|---|---|
| 1,823,590 | 9/1931 | Christensen | 188/360 X |
| 1,928,144 | 9/1933 | Vickers | 188/359 X |
| 2,058,586 | 10/1936 | Heiss et al. | 192/0.052 |
| 2,224,492 | 10/1933 | Stitt | 188/360 |
| 2,247,463 | 7/1941 | Allison | 192/995 |
| 2,817,359 | 12/1957 | Hayner | 137/625.65 |
| 3,100,508 | 8/1963 | Mercier | 137/625.66 |
| 3,177,777 | 4/1965 | Kenrick | 91/210 |
| 3,352,392 | 1/1967 | Black et al. | 192/3.5 |
| 3,563,273 | 2/1971 | Mills | 137/625.69 |
| 3,626,973 | 12/1971 | Mason | 137/460 |
| 4,606,448 | 8/1986 | Kamio | 192/85 R |

FOREIGN PATENT DOCUMENTS 541533 10/1955 Belgium .
420858 12/1934 United Kingdom ................ 188/360

Primary Examiner—Dwight G. Diehl
Assistant Examiner—Nicholas Whitelaw
Attorney, Agent, or Firm—Seed and Berry

[57] ABSTRACT

A clutch booster control system having parallel booster cylinder and a control valve, the booster cylinder having an extendible rod and being operatively connected between the vehicle frame and the clutch operating lever, the control valve having a slidable piston and being connected between the clutch operating lever and the pedal linkage. Movement of the clutch pedal moves the control valve piston to provide air to the booster cylinder for operating the clutch operating lever.

5 Claims, 1 Drawing Sheet

CLUTCH BOOSTER CONTROL VALVE SYSTEM

TECHNICAL FIELD

The present invention is directed to an improved clutch booster control valve system for a truck or other road vehicle.

BACKGROUND ART

The number of heavy commercial trucks on American highways is increasing every year. As the number of heavy commercial trucks increases, the types of people who drive these trucks is changing. Many of the new drivers are women who find the effort required to operate a manual clutch on a heavy commercial truck physically difficult.

The pedal force required to operate a manual clutch on a heavy commercial truck can be as high as 75 pounds. This pedal force is approximately twice the force required to operate a manual clutch on a light vehicle. Frequent shifting in high density traffic or holding the clutch pedal down during long stops can be fatiguing. Power assistance to reduce the effort required to operate the manual clutch of a heavy commercial truck is thus desirable.

The concept of providing power assistance for manually operated devices is not new. There are many existing techniques to accomplish power assistance. These devices tend to be complicated which makes them expensive and comprises reliability. Also, these devices frequently have slow response time and they do not provide assistance proportional to the pedal effort.

To provide power assistance for reducing the effort to operate a manual clutch, it is desirable to have a device that provides assistance that is proportional to the effort exerted on the clutch pedal, thereby maintaining the "natural feel" of the operation of the clutch. The response of the device should be quick enough to allow the driver to double clutch when shifting the transmission and the device should be relatively simple to keep manufacturing costs low and reliability high.

Although much of the discussion herein relates to the application of power assistance devices which reduce the effort of operating manual clutches on heavy commercial trucks, it is not intended that the invention be limited to such operations. It will be obvious from the description that follows that the present invention will be useful in other vehicles facing the problems common to those described herein.

DISCLOSURE OF THE INVENTION

It is an object of this invention to provide a power assistance device to reduce the effort required to operate a manual clutch on a heavy commercial truck.

It is a further object of this invention to provide a clutch power assistance device in which the power assistance is proportional to the effort exerted on the clutch pedal.

It is another object of this invention to provide a clutch power assistance device which has a response time that is quick enough to allow double clutching.

It is a further object of this invention to provide a clutch power assistance device that is reliable, and relatively simple and inexpensive.

It is another object of this invention to provide a clutch power assistance device which reverts to standard manual operation in the event of a power failure.

Basically, those objects are obtained by connecting a booster cylinder having an extendible rod between the vehicle frame and the clutch operating lever, connecting a control valve having a movable valve core or piston between the clutch operating lever and the pedal linkage, and connecting the control valve and the booster cylinder with pressurized fluid responsive to motion of the clutch pedal to provide extension of the booster cylinder extendible rod to move the clutch operating lever and disengage the clutch.

Preferably, the booster cylinder and the control valve are generally parallel and coextensible for providing proportional movement of the clutch operating lever responsive to movement of the clutch pedal.

The control valve is provided in one embodiment with a valve body having a slidable piston at one end and a proportioning chamber at the opposite end, the piston has a passage communicating in different operative positions to an exhaust port and a booster cylinder delivery port and to a supply port and the booster cylinder delivery port.

BEST MODE FOR CARRYING OUT THE INVENTION

Figure 1:
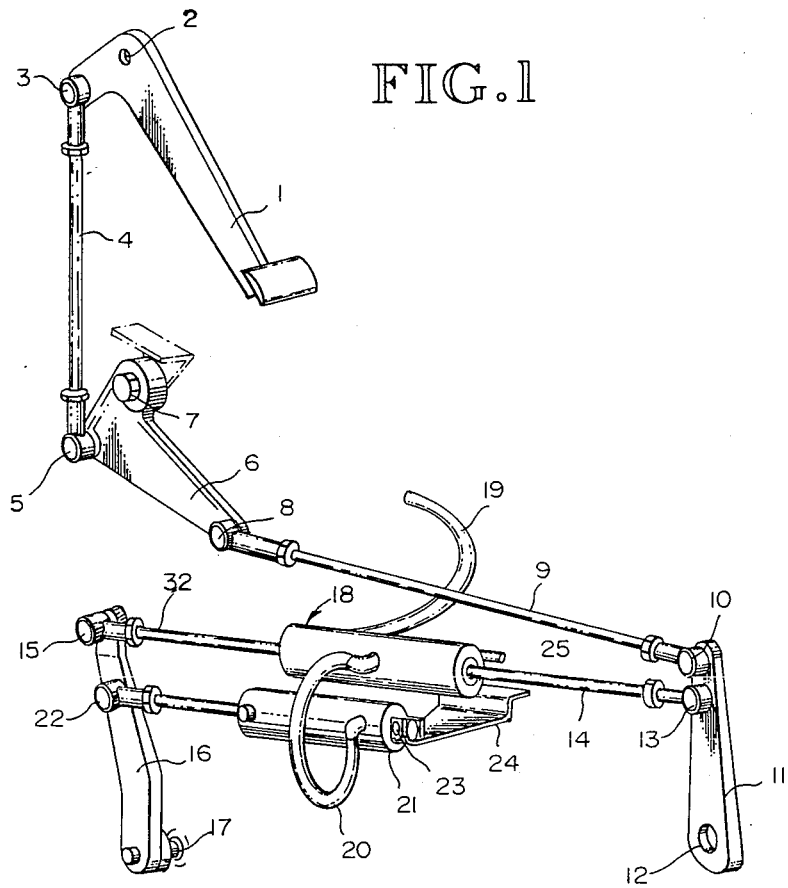
FIG. 1 is a schematic of a clutch linkage system employing the herein described clutch booster system.

Referring to FIG. 1, shown is a clutch pedal level 1 pivoted to the vehicle structure at 2. Pivotally connected to the clutch pedal lever at 3 is a linkage rod 4 which is also pivotally connected to the vehicle structure at 7 and pivotally connected to a linkage rod 9 at 8. A linkage rod 9 is pivotally connected at 10 to the lever 11. The lever is pivotally connected to the vehicle structure at 12 and to linkage rod 14 and 13. The linkage rod 32 is pivotally connected at 15 to clutch lever 16. Clutch lever 16 is securely fastened to clutch control shaft 17 which engages and disengages the clutch by rotating about control shaft 17.

Note that when the clutch pedal lever 1 is depressed (disengaging the clutch), both linkage rods 9 and 14 are in compression.

The clutch booster system is shown installed in the manual clutch linkage system. When the clutch pedal lever 1 is depressed, linkage rods 9 and 14 are in compression as before, but now the compressive force in linkage rod 14 actuates the control valve 18. The control valve 18 receives supply air from supply line 19 and when actuated, delivers a proportionate amount of delivery air to booster cylinder 21 via cylinder delivery line 20. The booster cylinder is pivotally connected to clutch lever 16 as at 22. The booster cylinder applies a force onto clutch lever 16 assisting the clutch disengaging process. The booster cylinder 21 is pivotally connected to a mounting bracket 24 at 23. The mounting bracket 24 is the means of transferring the reaction force from the booster cylinder to the vehicle structure. Releasing the clutch pedal lever 1 reduces the compressive force on control valve 18 which proportionally exhausts air via an exhaust line 25 from booster cylinder 21 and delivery line 20.

The control valve has a piston 30 slidable in a valve body 31. The opposite end of the housing from the piston is connected to a linkage 32 joined to connection 15. Supply and delivery ports 34 and 36, respectively, are coupled to air supply line 19 and to air delivery line 20. An exhaust port 38 is connected to atmosphere via exhaust line 25.

Figure 2:
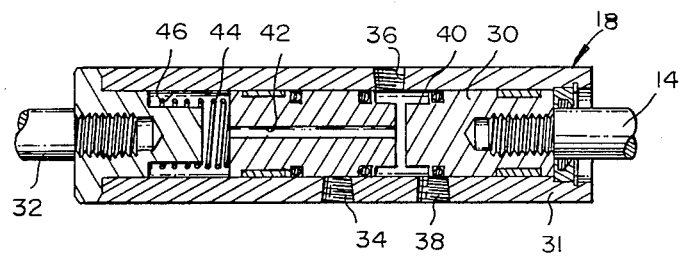
FIG. 2 is a schematic of a control valve for the clutch booster system.

A channel 40 is provided around the periphery of the piston and communicates with a bore 42. The piston is urged to the right in FIG. 2 by a spring 44 in a proportioning chamber 46.

The ports 34, 36, 38, bore 42, and channel 40 are all of large size so as to allow quick air passage to move the booster cylinder rod. This assures that the booster cylinder provides quick response sufficient to enable the vehicle operator to "double clutch" when shifting to another gear.

Because the valve 18 and booster cylinder 21 are separate parts they can be simple mechanisms and the cost of manufacturing each is kept to a minimum. This reduced cost allows the booster system to be a feasible component for the vehicle.

In addition, loss of air supply will not affect manual operation of the clutch. If air is lost, the piston 30 will be pushed against the opposite end of the valve body, and thence push linkage 32 to manually disengage the clutch.

When the clutch pedal is depressed, the control valve is in compression. This pushes the piston 30 into the valve body compressing the return spring 44 and decreasing the volume of the proportioning chamber. The piston continues to move inside the valve body until the supply and delivery ports 34 and 36, respectively, are both open and the exhaust port 38 is closed. At this point, the booster cylinder and proportioning chamber 46 are pressurized causing the booster cylinder to push on the clutch lever (the assist force).

It is important to note that the booster cylinder and the proportioning chamber are always at equivalent pressures. A pressure inside the proportioning chamber causes a force which acts on the piston, hence realized in the clutch pedal. So if the booster cylinder is acting on a clutch lever with particular response characteristics, those same response characteristics will be transmitted through the control valve to the clutch pedal and the clutch will feel the same to the driver as without the booster system, just easier to use because of the assist force.

When the operator removes pressure from the foot pedal 1, the return spring 44 moves the piston 30 to the right to close the supply port and connect the cylinder delivery port, the exhaust port and the proportioning chamber. The clutch lever 16 is returned by the return spring in the clutch.

While the preferred embodiments of the invention have been illustrated and described, the invention is not to be limited to the specific embodiment illustrated in the drawings.

I claim:

1. A clutch booster system for a vehicle having a frame, a clutch operating lever, a pedal, and linkage means interconnecting the pedal and the clutch operating lever, said system comprising:
a booster cylinder connected between a vehicle frame and a clutch operating lever, and having an extensible piston rod;
a control valve mounted separately from the booster cylinder and movable independently from the booster cylinder, said control valve having a valve body and a movable piston, the valve body having a supply port, and an exhaust port, the valve body also having a booster cylinder delivery port connected to the booster cylinder, the piston having passages interconnecting said chamber and ports;
said control valve piston and valve body being connected between the clutch operating lever and the pedal, whereby movement of the clutch pedal when depressed moves the piston and valve body relative to one another to connect the supply port and the booster cylinder delivery port to extend the booster cylinder and when the clutch pedal is released, to connect the booster cylinder delivery port and the exhaust port to retract the booster cylinder, thereby providing a power assist to the clutch operating lever proportional to the movement of the clutch pedal.

2. The system of claim 1, said valve body including a proportioning chamber, said proportioning chamber having a return spring therein to return the piston, and connecting the booster cylinder delivery port and the exhaust port.

3. The system of claim 1, said booster cylinder being generally parallel to said control valve.

4. A clutch booster system for a vehicle having a clutch operating lever adapted to disengage a clutch on the vehicle, a pedal, and linkage means interconnecting the pedal and the clutch operating lever, said system comprising:
a fluid-powered booster cylinder connected to a clutch operating lever for moving the lever; and
control means operatively connected between the clutch operating lever and a pedal, and connecting fluid pressure to the booster cylinder to connect motion of the pedal into movement of the booster cylinder for assisting operating the clutch operating lever responsive to the pedal motion, said control valve means including a proportioning device which restricts the fluid pressure to the booster cylinder for simulating the same clutch pedal response characteristics as in a nonpressure boosted clutch pedal operating system.

5. A clutch booster control valve system for a vehicle having a frame, a clutch operating lever adapted to disengage a clutch, a pedal, and linkage means interconnecting the pedal and the clutch operating lever, said system comprising:
a booster cylinder having an extendible rod at one end with one end attached to a clutch operating lever and an opposite end attached to a vehicle frame;
a control valve with a hollow outer body, having an inner surface, a supply port, an exhaust port and a cylinder delivery port, and having one end attached to said clutch operating lever;
a control valve piston coaxial with said control valve outer body, with one end of said piston operatively coupled to said clutch pedal;
a proportioning chamber formed on an end of said control valve outer body;
a passage contained in said control valve piston which allows communication between said proportioning chamber and through said control valve to said booster cylinder;
said piston in one position coupling said booster cylinder and said proportioning chamber through said cylinder delivery port;
said pressurizing air supplied to said booster cylinder and said proportioning chamber through said supply port; and
said piston in a second position connecting said proportioning chamber and said cylinder delivery port to said exhaust port.

* * * * *